United States Patent [19]

Leslie

[11] Patent Number: 4,611,485
[45] Date of Patent: Sep. 16, 1986

[54] HIGH PRESSURE PIPE STOPPER

[75] Inventor: Bruce E. Leslie, Baden, Pa.

[73] Assignee: Thaxton, Inc., Gibsonia, Pa.

[21] Appl. No.: 677,208

[22] Filed: Dec. 3, 1984

[51] Int. Cl.⁴ .......................... F16L 55/10; G01M 3/02
[52] U.S. Cl. ...................................... 73/49.8; 73/49.1; 138/90; 411/55; 411/65
[58] Field of Search .................... 138/89, 90; 73/49.8, 73/49.5, 49.1, 46; 220/235, 236, 237, 319; 411/55, 60, 63, 64, 65; 285/18

[56] References Cited

U.S. PATENT DOCUMENTS

| 3,323,551 | 6/1967 | Bell et al. | 138/90 |
| 3,983,904 | 10/1976 | Laviano | 138/90 |
| 4,282,982 | 8/1981 | Nuesslein | 220/237 |
| 4,381,800 | 5/1983 | Leslie | 138/90 |
| 4,385,643 | 5/1983 | Noe | 138/90 |

FOREIGN PATENT DOCUMENTS 9047 of 1902 United Kingdom ................. 138/89

Primary Examiner—Stewart J. Levy
Assistant Examiner—Hezron E. Williams
Attorney, Agent, or Firm—Webb, Burden, Robinson & Webb

[57] ABSTRACT

A high pressure pipe stopper includes an elongated stem having a threaded section and terminating at a first end in a conically shaped mandrel having an exterior surface sloped at an angle of about 5°. The pipe stopper also includes a plurality of grip segments about the stem and a nut engaged with the threaded section to force the grip segments up along the mandrel. The pipe stopper may also include an extractor coupling connected between the nut and grip segments such that the grip segments are drawn down the mandrel when the nut is turned away from the mandrel.

15 Claims, 13 Drawing Figures

HIGH PRESSURE PIPE STOPPER

BACKGROUND OF THE INVENTION

1. Field of the Invention

My invention relates to pipe stoppers and, more particularly, to high pressure pipe stoppers which will not damage the inner surface of the pipe under test and which can be easily removed from a pipe once the test is completed.

2. Description of the Prior Art

The use of pipe stoppers in testing pipes, tubing, boilers, heat exchangers and other types of pressure vessels is well established in the art. For example, in testing a length of pipe for structural integrity and the ability to withstand a particular pressure, the entire length of pipe is sealed at both ends by an appropriate stopper and hydrostatic pressures are introduced through the pipe stopper.

A typical prior art high pressure pipe stopper includes a stem that terminates in a mandrel which is surrounded by a plurality of steel grips. The grips are provided with a sloped inner surface and by moving the grips up the sloped surface of the mandrel, typically sloped at an angle of 15°–20° or more, the grips are brought into contact with the inner surface of the pipe. Serrations on the outer surface of the grips provide positive engagement with the pipe. A threaded nut moves the grips, either directly or through a contact washer or the like; and holds the grips securely in place until the testing is completed. Since both ends of the pipe are closed, the stem of the pipe stopper includes a clearthrough passage for filling and venting. High pressure pipe stoppers of this type are shown in U.S. Pat. Nos. 2,855,003 and 4,381,800.

Pipe stoppers are commonly used to test lengths of metal pipe, such as pipe made from titanium, prior to its installation in military aircraft. This titanium pipe is subjected to testing under rather high pressures, upwards of 15,000 psi, and the use of pipe stoppers having serrations on the grips has been necessary in order to function under these high pressures. However, the serrations dig into the pipe and damage the inner surface of the pipe at each end. Before the tested pipe may be installed, it becomes necessary to cut off the damaged ends of the pipe. The use of such prior art pipe stoppers results in the waste of up to three inches or more in length from each end of the pipe and is, obviously, not desired.

Accordingly, it is an object of the present invention to provide a pipe stopper which will withstand high pressures but will not significantly damage the inner surface of the ends of the pipe under test.

For a pipe stopper to function at high pressures, a strong connection must be made between the pipe and the stopper itself. Often times the connection is so strong that the stopper cannot be easily removed by merely loosening the nut and pulling outwardly on the stem. Workers testing a section of pipe have often had to resort to striking the pipe stopper with a sledge hammer before the stopper became loose enough to remove. Such actions are generally harmful to the end of the pipe and result in more of the pipe being cut off and discarded.

Therefore, it is a further object of the present invention to provide a pipe stopper which can be easily removed from the end of a pipe without damaging the pipe.

SUMMARY OF THE INVENTION

Therefore, I have invented a high pressure pipe stopper for insertion into the interior of a pipe to be tested and into contact with the inner surface of the pipe. The pipe stopper includes an elongated stem having a threaded section and terminating at a first end in a conical shaped mandrel having an exterior surface sloped at an angle of about 5°. The pipe stopper also includes a plurality of grip segments arranged in a cylindrical form about the stem, with each of the grip segments having a substantially smooth outer surface and having an inner surface complementary in shape to the exterior surface of the mandrel and in sliding engagement therewith. A nut is threadably engaged with the threaded section and, when turned, forces the grip segments up the mandrel. The grip segments diverge outwardly as they travel up the mandrel and then engage the inner surface of the pipe to fasten the pipe stopper securely therein.

The grip segments include one or more external annular recesses which accommodate an O-ring for retaining the segments about the stem. The mandrel has a stop at its terminal end and an O-ring, with or without a back-up ring, is provided in an annular recess in the stem. The stem has an axial opening extending therethrough and may include another threaded section and a knurled section adjacent its other or second end.

The pipe stopper may also include an extractor coupling connected between and in engagement with the nut and the grip segments such that when the nut is turned away from the mandrel the grip segments are drawn down the mandrel and away from the pipe inner surface. The extractor coupling may include a plurality of extractor segments arranged in a cylindrical form about the stem and held in engagement with the nut and grip segments. The nut and grip segments may be provided with an external annular recess, with each recess adapted to receive and engage a corresponding inwardly directed lip on the extractor segments. The extractor segments may include one or more external annular recesses which accommodate an O-ring and retain the extractor segments about the stem.

DETAILED DESCRIPTION OF THE DRAWINGS

Figure 1:
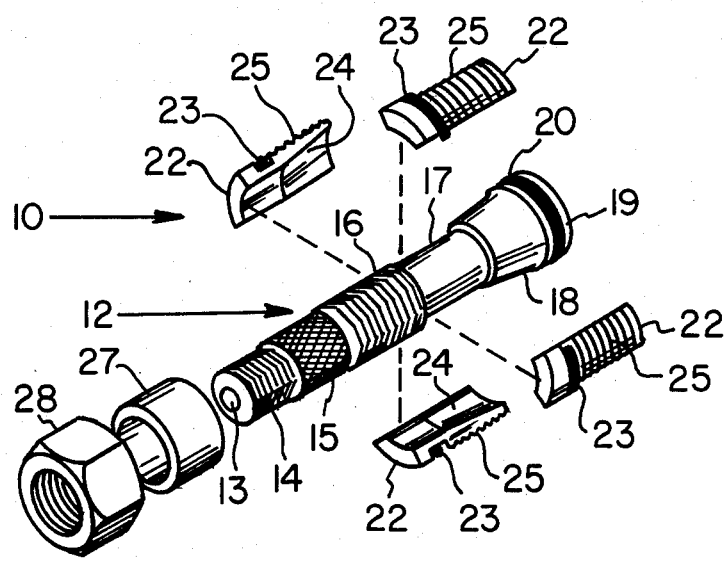
FIG. 1 is an exploded perspective view of a prior art pipe stopper.
Figure 2:
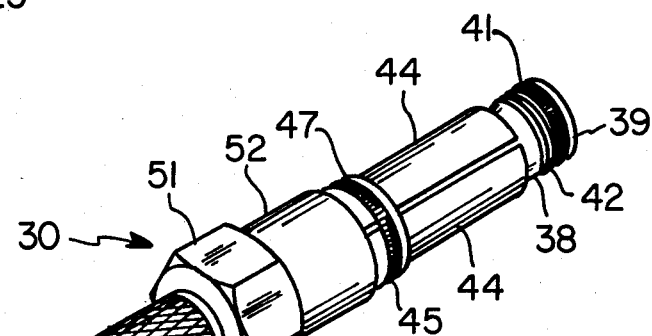
FIG. 2 is a perspective view of one embodiment of a pipe stopper in accordance with the present invention.
Figure 3:
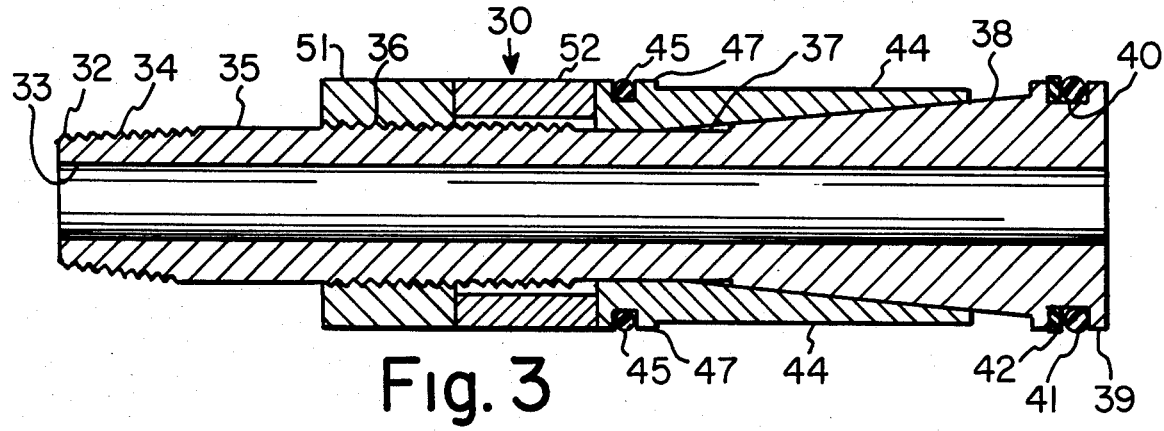
FIG. 3 is a section taken through the axial center of the pipe stopper shown in FIG. 2.
Figure 4:
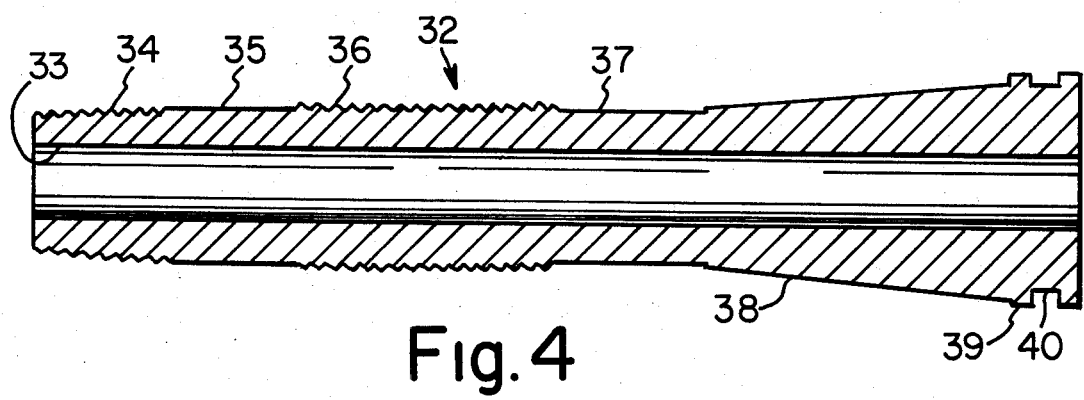
FIG. 4 is a section taken through the axial center of the stem of the pipe stopper shown in FIG. 2.
Figure 5:
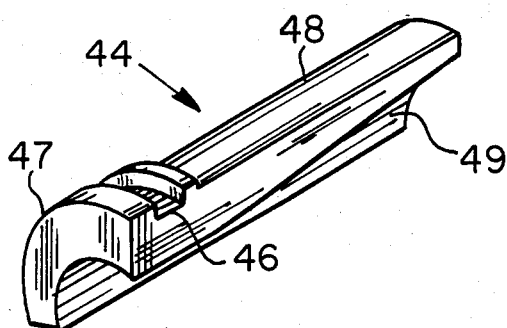
FIG. 5 is a perspective view of one of the grips in the pipe stopper shown in FIG. 2.
Figure 7:
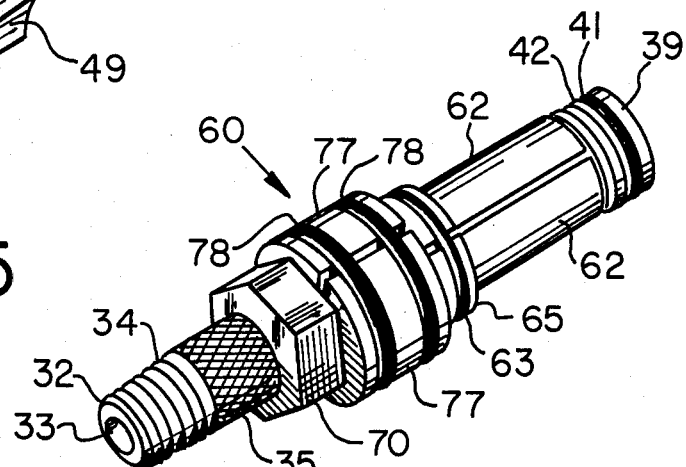
FIG. 7 is a perspective view of a second embodiment of a pipe stopper in accordance with the present invention.

A prior art pipe stopper, generally designated by reference number 10, is illustrated in FIG. 1. The stopper 10 includes an elongated stem 12 with an axial opening 13 extending completely through the stem 12. The stem 12 includes, moving from one end to the other, threaded section 14, knurled section 15, threaded section 16, smooth section 17, and a conical shaped fixed mandrel 18 having an appropriate stop 19 at its terminal end. The stop 19 at the end of mandrel 18 has an external annular recess which holds O-ring 20. A plurality of steel grips 22 are held in place around stem 12 by means of an appropriate O-ring 23. Depending on the size of the pipe stopper, more than one O-ring may be employed to retain the steel grips 22 in place. The mandrel 18 is typically of short length and has a surface angle of 15°-20° or more. The inner surface 24 of the grips 22 is provided with a taper to match the slope of the mandrel 18 and the outer surface 25 of the grips 22 is provided with a plurality of serrations or the like. A compression sleeve 27 or the like is positioned over the stem 12 and a nut 28 threadably engages threaded section 16 on the stem 12 so as to force the sleeve 27 against the grips 22 causing the grips 22 to diverge and move outwardly as they move along the tapered mandrel 18. When the pipe stopper 10 is positioned within a pipe, the grips 22 will continue to diverge until they make secure contact with the inner surface of the pipe, with the serrated outer surface 25 digging into the pipe. The knurled section 15 is provided for ease of handling. The threaded portion 14 on the end of the stem 12 opposite the mandrel 18 is provided to allow the pipe stopper 10 to be connected to a source of pressure in communication with clear-through opening 13 or to enable opening 13 to be sealed off by a threaded cap or the like.

One embodiment of a high pressure pipe stopper in accordance with the present invention is shown in FIGS. 2-6 and is generally designated by the reference number 30. The pipe stopper 30 includes an elongated stem 32 with an axial opening 33 extending completely therethrough. At one end the stem 32 includes a first exteriorly threaded section 34. A knurled section 35 and a second threaded section 36 are provided, respectively, on the stem 32 adjacent the first threaded section 34. The stem 32 continues with a smooth section 37 and a conical shaped fixed mandrel 38 having a stop 39 at its terminal end. The mandrel 38 has a smooth external surface which slopes upward toward stop 39 at a small angle of about 5°. The stop 39 has an external annular recess 40 which is adapted to receive O-ring 41. External recess 40 may also include back-up ring 42 to prevent deformation of O-ring 41 against external recess 40 when the pipe stopper 30 is subjected to high pressures.

A plurality of grip segments or grips 44 are arranged in a cylindrical form about the stem 32 and are retained in an assembled relation by an O-ring 45 encircling the assembly. O-ring 45 is secured against dislodgement by being positioned in an external annular recess or recessed groove 46 in the flanged end 47 of the grips 44.

Each grip 44 is formed with a substantially smooth outer surface 48 and with a smooth inner surface 49 which is complementary in shape to the external surface of the mandrel 38 and which functions cooperatively with the mandrel 38 in sliding engagement therewith during operation of the pipe stopper 30. It can be seen that together the plurality of grips 44 form a hollow, cylindrically shaped structure encircling the stem 32 and capable of being expanded in the same manner as prior art grips. While the use of four grips 44 is shown in the Figures, the use of two or more grips 44 would also function satisfactorily. An internally threaded nut 51 is engaged with threaded section 36 and either engages the flange end 47 of grips 44 directly or through a hollow, cylindrically shaped compression sleeve 52. Alternatively, compression sleeve 52 may be replaced by a thinner washer.

Figure 6:
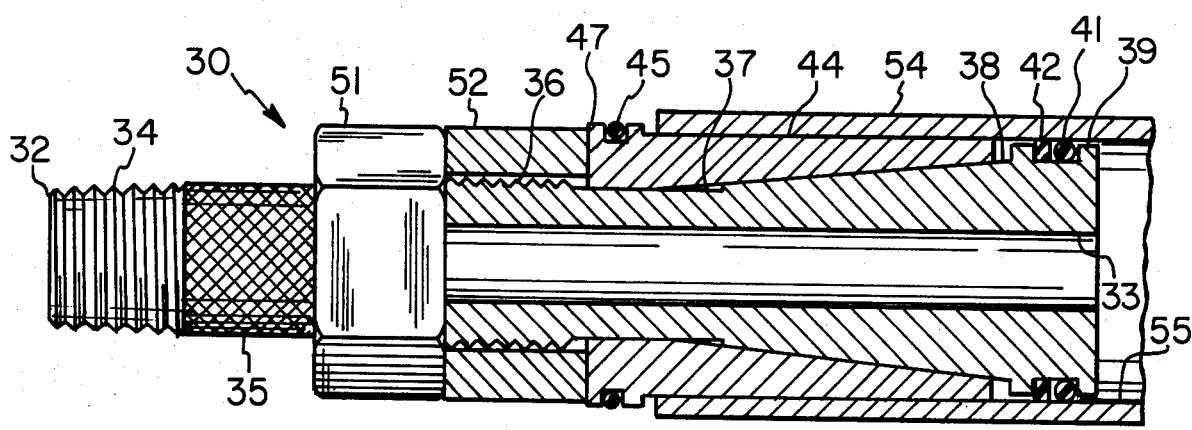
FIG. 6 is a view partly in section taken through a pipe to be tested and including the pipe stopper shown in FIG. 2.

The operation of pipe stopper 30 to seal the end of a pipe may be illustrated in connection with FIG. 6. The end of the stopper 30 adjacent mandrel 38 is inserted into the pipe 54 and, initially, only O-ring 41 contacts the inner surface 55 of the pipe 54. The grips 44 are positioned down the mandrel 38 and are located in a plane lower than the O-ring and having an outer diameter smaller than the inner diameter of pipe 54. The pipe stopper 30 is inserted into the pipe 54 for a desired distance until a portion of the grips 44 are within the pipe 54. At this point, the grips 44 are not in engagement with the inner surface 55 of the pipe 54. By turning nut 51 toward the mandrel 38 the compression sleeve 52 will force the grips 44 further into the pipe 54. At the same time, the grips 44 are being forced up the sloped surface of the mandrel 38 and toward the inner surface 55 of the pipe 54. The grips 44 continue to move both inward and upward until they securely engage the inner surface 55 of the pipe 54 and the nut 51 is tightened accordingly. The grips 44 remain in contact with the pipe 54 and hold the stopper 30 in engagement therein unitl the nut 51 is loosened and the grips 44 moved down away from the pipe 54.

As can be seen from the figures, the inner surface 55 of the pipe 54 is smooth. In order to prevent any gouging of or damage to the inner surface 55, the outer surface 48 of the grips 44 is substantially smooth and may have a No. 125 or No. 250 finish. Due to the small angle of slope of the mandrel 38 and its longer length, substantially all of the outer surface 48 of the grips 44 located within the pipe 54 will actually be engaged with the inner surface 55 of the pipe. This arrangement provides for a tight and nondestructive engagement between the pipe 54 and pipe stopper 30 which will withstand high pressures.

The pipe stopper 30 described above was tested in connection with the pressure testing of one inch OD titanium piping. The test pipe had a wall thickness of 0.070 inch and an inner diameter of 0.860 inch. A pipe stopper was placed in each end of the pipe and subjected to a test pressure of 15,500 psi for five minutes, the military test specification for one inch titanium tubing for aircraft. The pipe stopper functioned to withstand this pressure for the test period and the inner surface of the pipe was not damaged. Accordingly, the entire length of titanium pipe was usable without cutting off a length at each end.

A second embodiment of a high pressure pipe stopper is shown in FIGS. 7-13 and is generally designated by the reference numeral 60. Pipe stopper 30 and pipe stopper 60 are similar in many respects and, therefore, like reference numbers will be used to refer to like elements. Pipe stopper 60 includes elongated stem 32 as described above. Pipe stopper 60 also includes a plurality of grips 62 arranged in a cylindrical form about the stem 32 and retained in an assembled relation by O-ring 63. Grips 62 are similar to grips 44 described above and include external annular recess 64 for O-ring 63, flanged end 65, outer surface 66 and inner surface 67. Grips 62 also include a second external annular recess 68 in the flanged end 65, the purpose of which will be described hereinafter.

Figure 8:
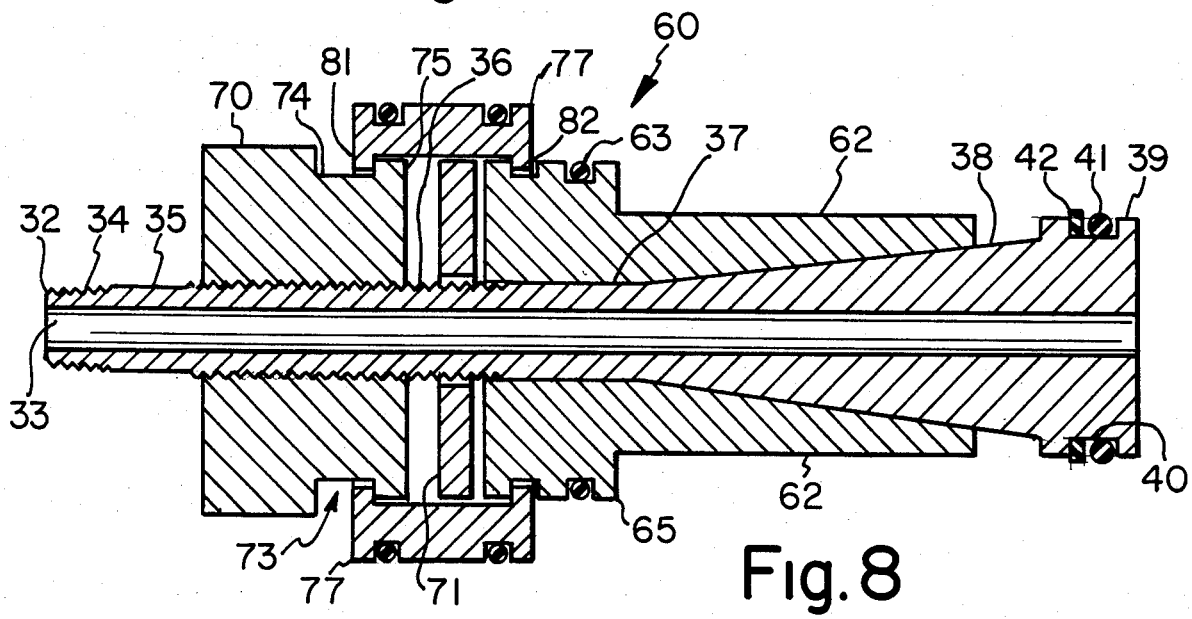
FIG. 8 is a section taken through the axial center of the pipe stopper shown in FIG. 7.
Figure 9:
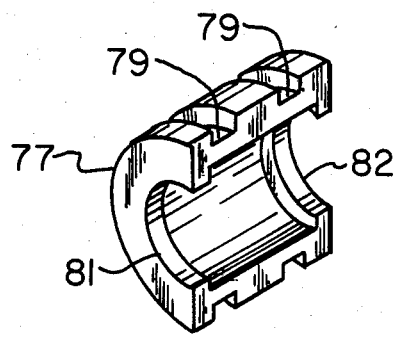
FIG. 9 is a perspective view of an extractor coupling segment in the pipe stopper shown in FIG. 7.
Figure 10:
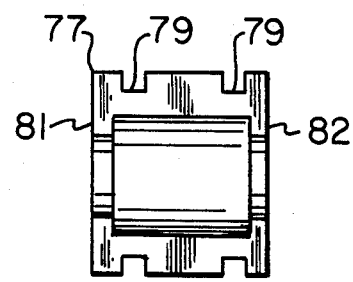
FIG. 10 is a side view of the extractor coupling segment shown in FIG. 9.
Figure 12:
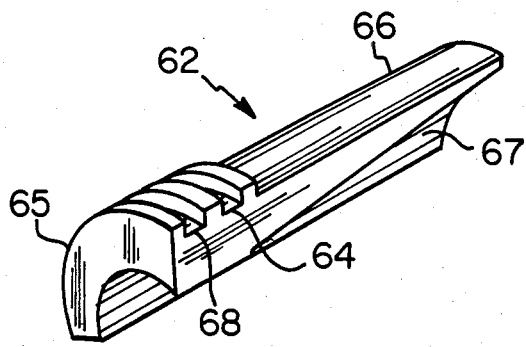
FIG. 12 is a perspective view of one of the grips in the pipe stopper shown in FIG. 7.
Figure 11:
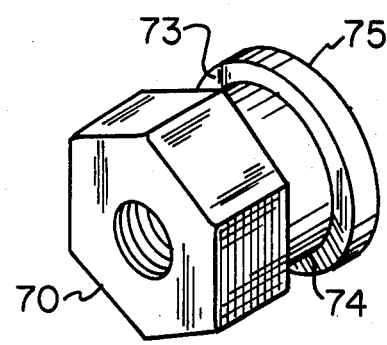
FIG. 11 is a perspective view of the nut assembly in the pipe stopper shown in FIG. 7.
Figure 13:
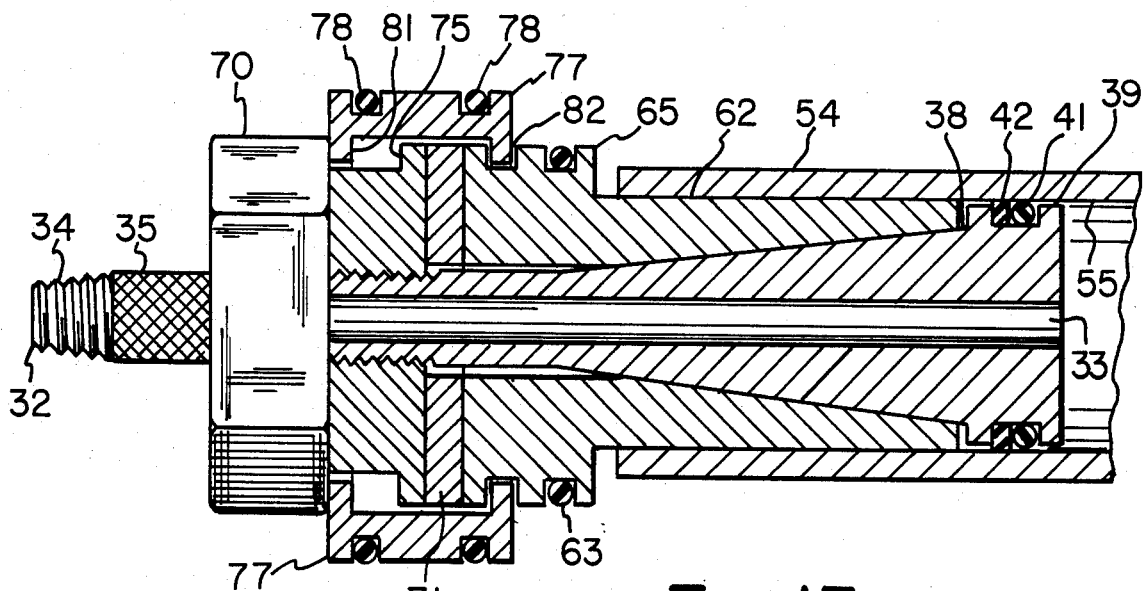
FIG. 13 is a view partly in section taken through a pipe to be tested and including the pipe stopper shown in FIG. 7.

A nut 70 is threadably engaged with threaded section 36 and, as shown in the FIGS. 8 and 13, engages the flanged end 65 of grips 62 through washer 71 which surrounds stem 32. Nut 70 includes an annular recess or groove 73 about its external surface. As shown in FIGS. 8, 11, and 13, groove 73 in nut 70 may be formed by a narrow cylindrical portion 74 extending outward from one face of nut 70 and terminating in upstanding cylindrical lip 75, with the groove 73 being formed between the lip 75 and face of nut 70.

Pipe stopper 60 also includes an extractor coupling which surrounds and joins together nut 70 and grips 62. The extractor coupling is formed of a plurality of extractor segments 77 which are arranged in a cylindrical form and are retained in an assembled relation by one or more O-rings 78 encircling the assembly. O-rings 78 are secured against dislodgement by being positioned in external annular recess 79 in extractor segments 77. Each extractor segment 77 is formed in the shape of a segment of a hollow cylinder and has lip 81 extending radially inwardly from one end and lip 82 extending radially inward from the other end. Each segment 77 is adapted to partially surround nut 70, the washer 71 and a portion of flanged end 65 of grips 62. Lip 81 is configured to engage recess 73 in nut 70 and lip 82 is configured to engage recess 68 in grips 62, thereby effectively joining nut 70 and grips 62 together. Although the extractor coupling is shown as including two extractor segments 77, it could be broken down into more segments if desired.

Pipe stopper 60 is shown installed in the end of pipe 54 in FIG. 13. The operation of pipe stopper 60 to seal the end of pipe 54 is identical to that described above in connection with pipe stopper 30. The extractor coupling included in pipe stopper 60 comes into play when nut 70 is loosened to withdraw pipe stopper 60. As shown in FIG. 13, recess 73 is somewhat wider than lip 81 so that lip 81 does not engage lip 75. As nut 70 is turned away from mandrel 38 to loosen pipe stopper 60, lip 81 and lip 75 will come into contact as shown in FIG. 8. Further turning will cause nut 70 to pull on the extractor segments 77 which will in turn pull on grips 62 due to the connection between lip 82 and recess 68 in grips 62. The movement of nut 70, extractor segments 77 and grips 62 will be to the left as viewed in FIGS. 8 and 13. Continued turning of nut 70 will pull grips 62 down mandrel 38 and away from and out of engagement with the inner surface 55 of pipe 54. By merely turning nut 70, pipe stopper 60 may be easily removed from within pipe 54 without the use of excessive force and without damage to the end of the pipe.

With the exception of the O-rings and the back-up seal, all of the elements of the pipe stopper described above are made of metal, preferably a hardened carbon steel or a hardened stainless steel.

Having described above the preferred embodiments of the present invention, it is to be understood that it may be otherwise embodied within the scope of the appended claims.

I claim:

1. A high pressure pipe stopper for insertion into the interior of a pipe to be tested and into contact with the inner surface of the pipe comprising:
   (a) an elongated stem having a threaded section and terminating at a first end in a conical shaped mandrel, said mandrel having an exterior surface sloped at an angle of about 5°;
   (b) a plurality of grip segments arranged in cylindrical form about the stem, each of said grip segments having a substantially smooth outer surface and having an inner surface complementary in shape to the exterior surface of the mandrel and in sliding engagement therewith;
   (c) a nut for threadably engaging the threaded section of the stem and engagably forcing the grip segments to move upward along the mandrel; and
   (d) an extractor coupling connected between and in engagement with said nut and said grip segments;
   whereby turning of the nut toward the mandrel causes the grip segments to diverge outwardly and engage the inner surface of the pipe to securely fasten the pipe stopper therein and whereby turning of the nut away from the mandrel causes the grip segments to be drawn down the mandrel and away from the inner surface of the pipe.

2. The pipe stopper of claim 1 wherein the extractor coupling includes a plurality of extractor segments arranged in a cylindrical form about the stem and held in engagement with the nut and grip segments.

3. The pipe stopper of claim 2 wherein the nut includes an external annular recess, the grip segments include a second external annular recess, and the extractor segments include a pair of inwardly directed lips, with one lip engaging the annular recess on the nut and with the other lip engaging the second annular recess on the grip segments.

4. The pipe stopper of claim 3 wherein the extractor segments include at least one external annular recess accommodating an O-ring for retaining the extractor segments about the stem and in engagement with the nut and grip segments.

5. A high pressure pipe stopper for insertion into the interior of a pipe to be tested and into contact with the inner surface of the pipe comprising:
   (a) an elongated stem having a threaded section and terminating at a first end in a conical shaped mandrel;
   (b) a plurality of grip segments arranged in cylindrical form about the stem, each of said grip segments having a substantially smooth outer surface and having an inner surface complementary in shape to the exterior surface of the mandrel and in sliding engagement therewith; and
   (c) a nut for threadably engaging the threaded section of the stem and engagably forcing the grip segments to move upward along the mandrel;
   (d) an extractor coupling connected between and in engagement with said nut and said grip segments;
   whereby turning of the nut toward the mandrel causes the grip segments to diverge outwardly and engage the inner surface of the pipe to securely fasten the pipe stopper therein and whereby turning of the nut away from the mandrel causes the grip segments to be drawn down the mandrel and away from the inner surface of the pipe.

6. The pipe stopper of claim 5 wherein the extractor coupling includes a plurality of extractor segments arranged in a cylindrical form about the stem and held in engagement with the nut and grip segments.

7. The pipe stopper of claim 6 wherein the nut includes an external annular recess, the grip segments include a second external annular recess, and the extractor segments include a pair of inwardly directed lips, with one lip engaging the annular recess on the nut and with the other lip engaging the second annular recess on the grip segments.

8. The pipe stopper of claim 7 wherein the extractor segments include at least one external annular recess accommodating an O-ring for retaining the extractor segments about the stem and in engagement with the nut and grip segments.

9. The pipe stopper of claim 5 wherein said grip segments include at least one external annular recess accommodating an O-ring for retaining the grip segments about the stem.

10. The pipe stopper of claim 5, said mandrel having a stop at its terminal end, wherein said stop has an external annular recess accommodating an O-ring for sealable engagement with the inner surface of the pipe.

11. The pipe stopper of claim 10 wherein said annular recess includes a back-up ring adapted to prevent deformation of said O-ring when the pipe stopper is subjected to high pressures.

12. The pipe stopper of claim 5 wherein said stem has an axial opening therethrough for communicating with the interior of said pipe.

13. The pipe stopper of claim 5 wherein said stem includes a knurled section adjacent said threaded section and directed toward a second end of the stem.

14. The pipe stopper of claim 13 wherein the stem terminates in a second threaded section at said second end.

15. The pipe stopper of claim 15 wherein the mandrel has an exterior surface sloped at an angle of about 5°.

* * * * *

UNITED STATES PATENT AND TRADEMARK OFFICE
CERTIFICATE OF CORRECTION

PATENT NO. : 4,611,485

DATED : September 16, 1986

INVENTOR(S) : Bruce E. Leslie

It is certified that error appears in the above-identified patent and that said Letters Patent is hereby corrected as shown below:

Claim 15 Column 8 Line 18 "claim 15" should read —claim 5—.

Signed and Sealed this

Sixteenth Day of December, 1986

Attest:

DONALD J. QUIGG

*Attesting Officer*   *Commissioner of Patents and Trademarks*